Dec. 28, 1926.  1,612,346

L. M. ASPINWALL

TRACTION CAR

Filed April 12, 1921    2 Sheets-Sheet 1

WITNESSES:
R. S. Harrison
H. C. Lowe

INVENTOR
Louis M. Aspinwall
BY
Wesley G. Carr
ATTORNEY

Dec. 28, 1926.

L. M. ASPINWALL 1,612,346

TRACTION CAR

Filed April 12, 1921    2 Sheets-Sheet 2

WITNESSES:
R. S. Harrison
H. C. Love

INVENTOR
Louis M. Aspinwall
BY
Wesley G. Carr
ATTORNEY

Patented Dec. 28, 1926.

1,612,346

UNITED STATES PATENT OFFICE.

LOUIS M. ASPINWALL, OF PITTSBURGH, PENNSYLVANIA, ASSIGNOR TO WESTINGHOUSE ELECTRIC & MANUFACTURING COMPANY, A CORPORATION OF PENNSYLVANIA.

TRACTION CAR.

Application filed April 12, 1921. Serial No. 460,699.

My invention relates to traction cars and it has particular relation to the running-gear and motor mounting of cars of relatively light weight, such, for example, as one-man cars.

One object of my invention is to provide a suitable method of mounting the body of a car upon a plurality of axles without employing a truck frame.

Another object of my invention is to provide an economical and effective mounting for removing the major portion of the dead weight of the running gear and motors from the axles of a car.

Briefly speaking, my invention consists in providing a plurality of solid axles for the car and having wheels pressed on both ends of each of the axles and a gear-wheel pressed upon an enlarged portion near the center of each axle. A housing of special construction is provided for enclosing a gear-wheel and a worm-shaft for actuating it. The housing is rigidly connected to a motor frame by means of a plurality of rigid members that provide a suitable support for the driving motor and that take the reaction of the worm drive from the motor housing. The rigid members are suspended by bolts from the car body, and springs, mounted upon the bolts, are provided to diminish shocks caused by the relative displacement of the car body to the car axles.

The motor and the gear housing are so balanced about the bolts which secure the rigid members upon which they are mounted to the car body that the weight of the housing is counterbalanced by the weight of the motor, thereby transmitting the weight of both through the bolts to the car body. Thence the weight is carried to a plurality of journals which are mounted upon the car axle adjacent to the wheels.

A special type of housing for the gear mechanism is provided that is more economical in construction and of fewer parts than those heretofore employed in the art. The car journals are also of special construction and permit of removal of the lower portion of the journal box without removing the upper portion of the journal box and the car body from the axle.

For a better understanding of my invention, reference may be made to the accompanying drawing, Figure 1 of which is a plan view of a car body, a car axle, driving mechanism for actuating the car axle and means for mounting the driving mechanism upon the car body;

Figure 1:
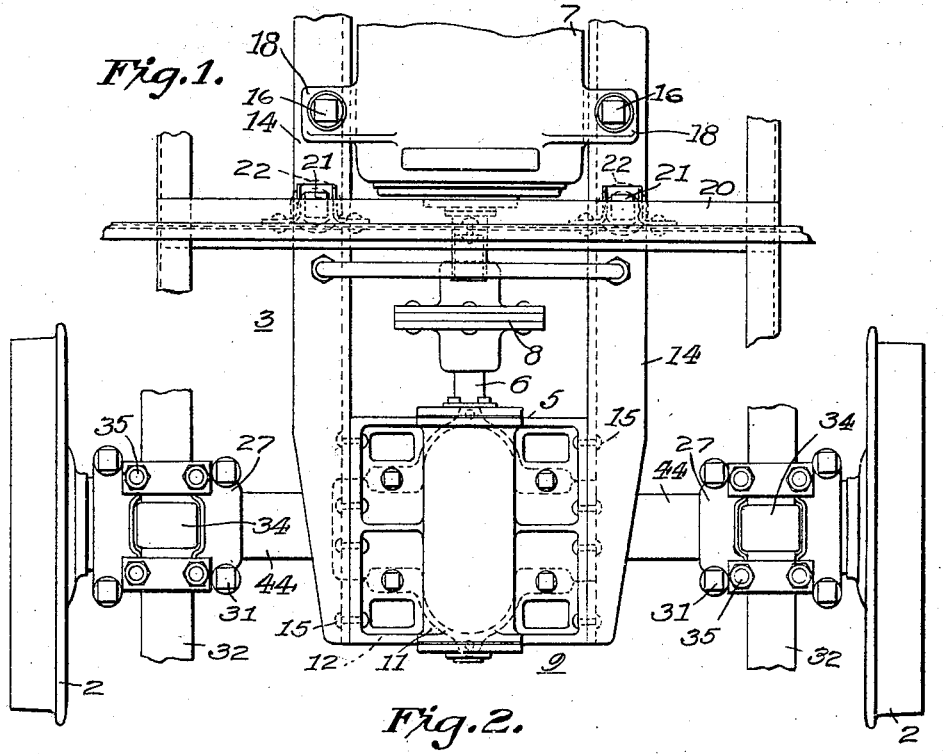
Figure 2:
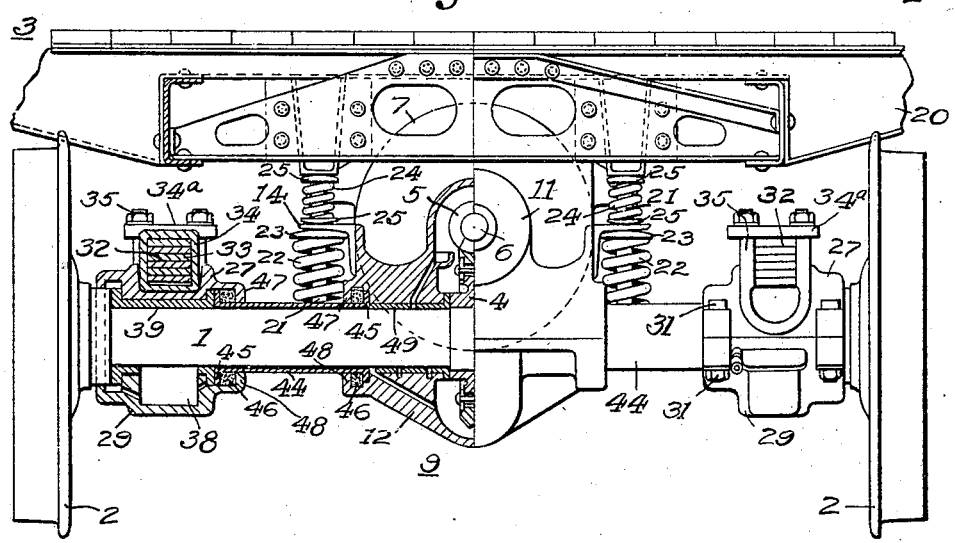
Fig. 2 is a view, partly in section and partly in end elevation of the apparatus shown in Fig. 1.
Figure 3:
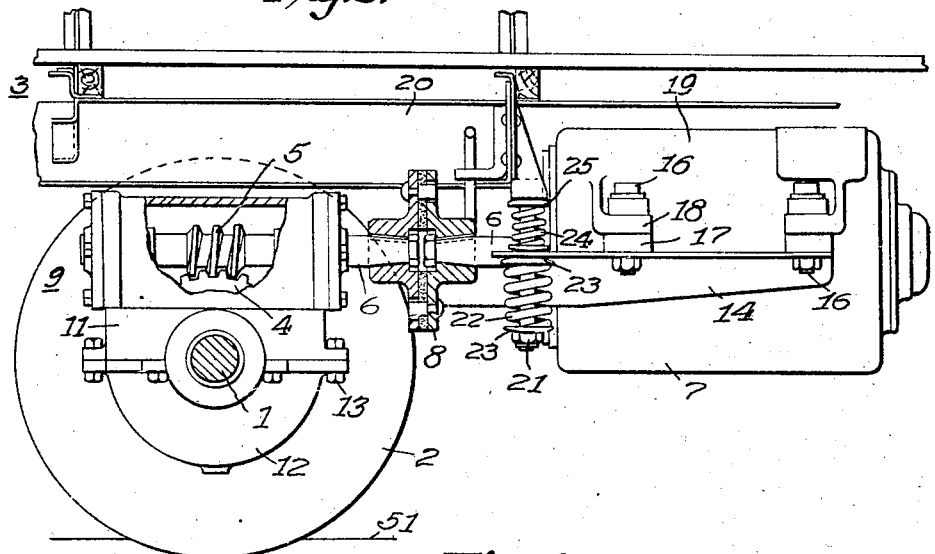
Fig. 3 is a view, partly in section and partly in side elevation, of the apparatus shown in Figs. 1 and 2

Referring particularly to Figs. 1, 2 and 3, an axle 1, having car wheels 2 pressed upon its ends, supports a car body 3. A gear-wheel 4 is pressed upon the axle 1 and is actuated by a worm 5 forming part of a driving shaft 6. The shaft 6 is actuated by a motor 7, to the armature of which it is mechanically connected by means of a coupling 8. The gear-wheel 4, the worm 5 and a portion of the shaft 6 are enclosed by a worm-gear housing 9. The worm-gear housing 9 comprises an upper portion 11 and a lower portion 12 which are secured together by means of bolts 13.

A composite frame comprising a plurality of supporting or rigid members, such as angle irons 14, are rigidly secured to the upper portion of the worm-gear housing 9 by means of a plurality of rivets or bolts 15. The motor 7 is mounted upon the supporting members 14 by means of bolts 16 and blocks of rubber or other resilient material 17, which are positioned, by bolts 16, between a plurality of lugs 18, forming part of the motor frame 19, and the supporting members 14. The supporting members 14 are suspended from the car body 3 by means of bolts 21, which are fastened to the channel members 20, which, in turn, constitute the floor beams of the car body 3. Resilient members 22 and washers 23 provide shock-absorbing means during the descent of the supporting members 14 upon the bolts 21. Resilient members 24 and a plurality of caps 25 are provided for absorbing the shock of upward movement of the supporting members 14 with relation to the car body 3.

The bolts 21 are positioned between the center of gravity of the motor 7 and the center of gravity of the worm-gear housing 9. By having the bolts 21 so positioned upon the supporting members 14 that the bolts 21 are at the center of gravity of the composite structure, formed by the worm-gear housing 9, the motor 7, the coupling 8 and the supporting member 14, the entire weight of this structure is supported by the bolts 21 and the resilient members 22 mounted thereon. This arrangement will remove the weight of the worm gear housing 9 from the central portion of the axle 1 and thus diminish the amount of dead weight thereon.

Figure 4:
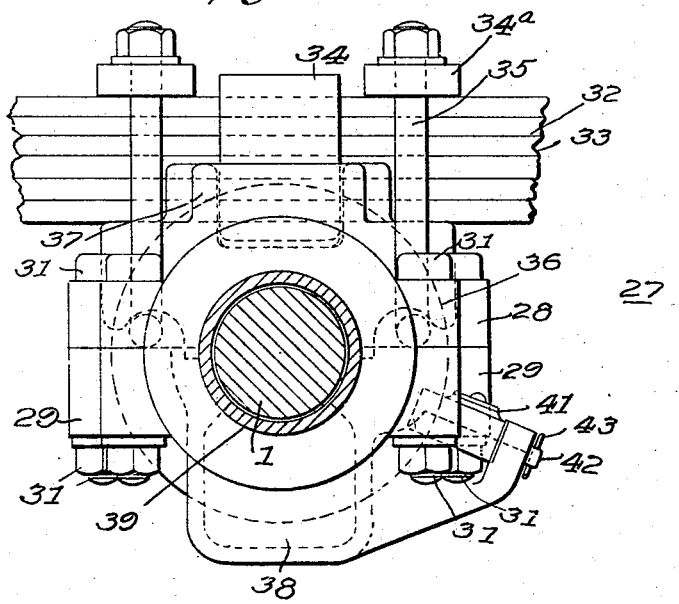
Fig. 4 is a view, partly in section and partly in end elevation, of a car journal designed in accordance with my invention.

The car body 3 is supported by a plurality of journal boxes 27, the detail view of one of the boxes 27 being shown in Fig. 4. The box 27 comprises an upper portion 28 and a lower portion 29, which are attached the one to the other by a plurality of bolts 31.

The journal boxes 27 are positioned upon the axle 1 adjacent to the wheels 2, thereby lessening the cross bending action of the weight of the car body 3 upon the axle 1.

A plurality of springs 32, comprising a number of flat sheets or leaves of steel 33, are mounted upon the journal boxes 22 and serve to provide a resilient mounting for the car body 3 to which they are connected. The sheets 33 are fastened together by means of a band 34 that is shrunk thereon. The springs 32 are positioned upon the upper casting 28 of the journal box 27 by means of a plurality of plates 34a and of bolts 35, which are curved around the lugs 36, forming part of the upper portion 28 of the journal box 27. A trough is formed by the lugs 37, which are located on the upper portion 28 of the journal box 27 (best illustrated in Figs. 2 and 4 of the drawings), to aid in positioning the spring 32 upon the journal box 28. The lower portion 29 of the journal box 27 comprises a hollow portion 38 for holding waste for lubricating the bearing 39 in which the axle 1 rotates.

Access to the hollow portion 38 of the lower portion 29 of the journal box 27 is effected by means of a cover member 41, which is pivotally mounted upon a bolt 42. The bolt 42 is maintained in position by means of cotter-pin 43.

A plurality of circular sleeves 44 having flared ends 45 are positioned upon the axle 1 between the journal box 27 and the worm-gear housing 9. A portion of the sleeve 44 is within the journal box 27 and fits against the bearing 39 thereof. A felt or rubber ring 46 is positioned between the flared portion 45 of the sleeve 44 and flanges 47 and 48 forming part of the upper portion 28 and the lower portion 29, respectively, of the journal box 27. The purpose of overlapping the sleeve 44 and the journal box 27 is to prevent leakage of oil along the axle 1. The sleeve 44 also acts as a spacer to take up end thrust of the journal boxes 27 towards the center of the axle 1.

A similar arrangement is provided for preventing oil from leakage from the bearing 49 of the gear housing 9, and a similar felt or rubber ring 46 is provided between the flared ends 45 of the sleeve 44 and the flanges 47 and 48 of the upper portion 11 and the lower portion 12, respectively, of the worm-gear housing 9.

The car wheels 2 are actuated along the rails 51 by the driving action of the motor 7 upon the worm 5 and the gear-wheel 4. If any of the wheels 2 are displaced by any irregularity in the track 51 the springs 32 will lessen the shock upon the car body 3 which, in turn, will transmit the shock to a less degree, to the motor 7 by reason of the resilient members 22 and 24 which are mounted upon the bolts 21. With this type of mounting, there will be a minimum degree of shock transmitted from the axle 1 to the driving mechanism and the motor 7 and but little dead weight upon the axle 1 thereby decreasing the wear upon the motor 7 and the driving mechanism, and lessening the operating cost.

While I have shown my invention in a preferred form, it is apparent that structural shapes other than the angles and channels shown in the drawing may be employed for forming the supporting portion of the car body and that the driving mechanism need not be of worm-gear type so long as the essential features of my invention are employed. These features include the removal of the major part of the dead weight from the axles of the car by balancing the motor 7 and the worm-gear housing 9 upon the bolts 21 and the methods of forming the worm-gear housing 9, journal boxes 27 and sleeves 44, which are positioned therebetween. I desire, therefore, to be limited only by the scope of the appended claims.

I claim as my invention:

1. The combination with a car body having an axle and wheels mounted thereon, of a motor, a gear mechanism actuated by said motor for driving said axle, a housing for enclosing said gear mechanism, a supporting member mechanically connected to both said mechanism and to said motor, and means comprising a resilient member for attaching said member to said car body.

2. The combination with a car body having an axle and wheels mounted thereon, of a motor, a gear mechanism actuated by said motor for driving said axle, a housing for enclosing said mechanism, a frame rigidly connected to said housing for supporting said motor and means for mounting said frame upon said car body, said means being attached to said frame at a point relatively near the common center of gravity of said motor, housing and frame.

3. The combination with a car body having an axle and wheels mounted thereon, of a motor, a gear mechanism actuated by said motor for driving said axle, a housing for substantially enclosing said axle, a rigid frame attached to said housing, said motor being mounted upon said frame, and resilient means for connecting said frame to said car body, said housing and said motor being placed upon opposite ends of said frame to balance one another about said resilient means.

4. The combination with a car body having an axle and wheels mounted thereon, of a motor, a mechanism actuated by said motor for driving said axle, a housing for enclosing said mechanism, a frame comprising a plurality of rigid members attached to said housing and said motor and means comprising a plurality of resilient members for yieldingly supporting said housing and said motor upon said car body.

5. The combination with a car body having an axle, and a plurality of wheels mounted upon said axle, of means adjacent to said wheels for supporting said body upon said axle, a motor, a mechanism actuated by said motor for driving said axle, a housing for enclosing said mechanism, and cushioning means for fastening said housing and said motor upon said body whereby the weight of said motor counter balances the weight of said housing.

6. The combination with a car body having an axle and a plurality of wheels mounted upon said axle, of a plurality of journals having springs mounted thereon for supporting said body, said journals being located adjacent to said wheels, a mechanism for driving said axle, a motor for actuating said mechanism, a housing for said mechanism, a rigid member mechanically connected to said housing and said motor, and means for so connecting said member to said car body that substantially all of the weight of said motor and said mechanism is transmitted to said journals.

7. The combination with a car body having an axle and a plurality of wheels mounted upon said axle, of a plurality of journals having springs mounted thereon for supporting said body, said journals being located adjacent to said wheels, a mechanism for driving said axle, a motor for actuating said mechanism, a housing for said mechanism, a rigid member mechaniically connected to said housing and said motor and means comprising a bolt and a plurality of springs mounted upon said bolt for yieldingly connecting said member to said body, said bolt being connected to said member between the center of gravity of said motor and the center of gravity of said housing.

8. The combination with an axle and a gear mechanism for actuating said axle, of a housing for enclosing said mechanism, a car journal mounted upon said axle, and a sleeve mounted upon said axle between said housing and said journal.

9. The combination with an axle and a gear mechanism for actuating said axle, of a housing for enclosing said mechanism, a car journal mounted upon said axle, and a sleeve mounted upon said axle between said housing and said journal, said housing and said journal overlapping the adjacent ends of said sleeve.

10. The combination with an axle and a gear mechanism for actuating said axle, of a housing for enclosing said mechanism and provided with a flange portion, a car journal mounted upon said axle and provided with a flange portion, and a sleeve mounted upon said axle between said housing and said journal, said sleeve being provided with flared ends adapted to co-operate with said flange portions of said housing and said journal to form a substantially leakage-proof housing for said axle.

11. The combination with an axle and a gear mechanism for actuating said axle, of a sleeve for enclosing a portion of said axle, said sleeve being provided with flared ends, a journal comprising an upper and a lower portion adapted to conform to said axle and to one of the flared ends of said sleeve and a housing comprising an upper and lower portion adapted to conform to said axle and to the other flared end of said sleeve.

12. The combination with an axle and a gear mechanism for actuating said axle, of a housing for said mechanism, a car journal mounted upon said axle, and means for transmitting the thrust of said journal box to said housing.

13. The combination with an axle and a gear mechanism for actuating said axle, of a housing for said mechanism, a car journal mounted upon said axle, and means positioned upon said axle for transmitting the thrust of said journal box to said housing.

In testimony whereof, I have hereunto subscribed my name this 31st day of March 1921.

LOUIS M. ASPINWALL.